United States Patent
Kim et al.

(10) Patent No.: US 9,877,269 B2
(45) Date of Patent: Jan. 23, 2018

(54) ELECTRONIC DEVICE AND METHOD OF CONNECTING ELECTRONIC DEVICE TO NETWORK

(71) Applicant: Samsung Electronics Co., Ltd., Suwon-si, Gyeonggi-do (KR)

(72) Inventors: Sae Rome Kim, Suwon-si (KR); Sung Soo Park, Seoul (KR); In Ho Baek, Suwon-si (KR); Su Ha Yoon, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 58 days.

(21) Appl. No.: 14/607,472

(22) Filed: Jan. 28, 2015

(65) Prior Publication Data
US 2015/0230158 A1   Aug. 13, 2015

(30) Foreign Application Priority Data
Feb. 10, 2014 (KR) .................. 10-2014-0015090

(51) Int. Cl.
| | |
|---|---|
| *H04W 4/00* | (2009.01) |
| *H04W 48/14* | (2009.01) |
| *H04W 48/16* | (2009.01) |
| *H04W 76/02* | (2009.01) |
| *H04W 48/20* | (2009.01) |

(52) U.S. Cl.
CPC ........... *H04W 48/14* (2013.01); *H04W 48/16* (2013.01); *H04W 76/027* (2013.01); *H04W 48/20* (2013.01)

(58) Field of Classification Search
CPC ..... H04W 36/08; H04W 48/00; H04W 24/10; H04W 4/005; H04W 84/12; H04L 45/00; H04L 63/0892
USPC ........................................................ 370/328
See application file for complete search history.

(56) References Cited

U.S. PATENT DOCUMENTS

| | | | |
|---|---|---|---|
| 8,717,931 B2 | 5/2014 | Taniuchi et al. |
| 8,738,983 B2 | 5/2014 | Gerstenberger et al. |
| 8,897,197 B2 | 11/2014 | Huang et al. |
| 9,137,621 B2 | 9/2015 | McCann et al. |
| 9,462,460 B2 | 10/2016 | Huang et al. |
| 9,622,155 B2 | 4/2017 | McCann et al. |
| 2003/0012173 A1 | 1/2003 | Rune |
| 2006/0187858 A1 | 8/2006 | Kenichi et al. |
| 2007/0195813 A1 | 8/2007 | Lin |

(Continued)

FOREIGN PATENT DOCUMENTS

| | | |
|---|---|---|
| CN | 101971546 A | 2/2011 |
| KR | 10-2007-0122193 A | 12/2007 |

(Continued)

*Primary Examiner* — Chi H Pham
*Assistant Examiner* — Alexander O Boakye
(74) *Attorney, Agent, or Firm* — Jefferson IP Law, LLP

(57) ABSTRACT

An electronic device is provided. The electronic device includes a communication unit configured to communicate with an Access Point (AP), a controller configured to find at least one AP through the communication unit, and transmit a query signal to the found at least one AP found through the communication unit to request a connection, wherein the controller sets up at least one of a maximum number of retransmission times of a query signal and a response standby time of the query signal based on at least one of a number of the found at least one AP and a quality of the found at least one AP.

20 Claims, 3 Drawing Sheets

(56) References Cited

U.S. PATENT DOCUMENTS

| | | | |
|---|---|---|---|
| 2009/0232096 A1* | 9/2009 | Taniuchi | H04W 36/08 370/331 |
| 2009/0285119 A1 | 11/2009 | Horn et al. | |
| 2010/0165947 A1 | 7/2010 | Taniuchi et al. | |
| 2011/0004797 A1 | 1/2011 | Gerstenberger et al. | |
| 2011/0161355 A1* | 6/2011 | Lee | H04L 45/00 707/769 |
| 2011/0282961 A1* | 11/2011 | Montemurro | H04L 63/0892 709/207 |
| 2012/0063297 A1 | 3/2012 | Hong | |
| 2012/0230304 A1 | 9/2012 | Barbu et al. | |
| 2013/0051303 A1 | 2/2013 | Huang et al. | |
| 2013/0107757 A1 | 5/2013 | Cherian et al. | |
| 2013/0121325 A1* | 5/2013 | McCann | H04W 48/12 370/338 |
| 2014/0016628 A1 | 1/2014 | McCann et al. | |
| 2015/0065126 A1 | 3/2015 | Jung et al. | |
| 2015/0078365 A1 | 3/2015 | Huang et al. | |
| 2016/0007272 A1 | 1/2016 | McCann et al. | |
| 2017/0215129 A1 | 7/2017 | McCann et al. | |

FOREIGN PATENT DOCUMENTS

| | | |
|---|---|---|
| KR | 10-2012-0104421 A | 9/2012 |
| KR | 10-2015-0025208 A | 3/2015 |
| WO | 2013/063598 A2 | 5/2013 |
| WO | 2013-184110 A | 12/2013 |
| WO | 2014-008605 A | 1/2014 |

* cited by examiner

ELECTRONIC DEVICE AND METHOD OF CONNECTING ELECTRONIC DEVICE TO NETWORK

CROSS-REFERENCE TO RELATED APPLICATION(S)

This application claims the benefit under 35 U.S.C. §119 (a) of a Korean patent application filed on Feb. 10, 2014 in the Korean Intellectual Property Office and assigned Serial number 10-2014-0015090, the entire disclosure of which is hereby incorporated by reference.

TECHNICAL FIELD

The present disclosure relates to an electronic device connecting to an Access Point (AP) through a short-range wireless network and a method of connecting an electronic device to a network.

BACKGROUND

With the recent rapid development of electronic technology, various electronic devices that may transmit information or data have been developed and used. Also, communication technology for mutual connection of electronic devices has also been rapidly developed. For example, various short-range wireless communication technologies, such as Wireless Fidelity (WiFi) technology and Bluetooth technology, have been recently developed and used.

WiFi technology is a kind of a short-range wireless communication technology for connecting an electronic device present within a certain distance from a place where an Access Point (AP) is installed to the AP. The electronic device may be connected to a network such as internet through the AP.

In order for the electronic device to connect to the AP through a WiFi network, a certain setup operation may be involved. For example, in order to connect to the AP through the WiFi network provided by a network operator, there may be a process of inputting information authenticating that a device is a subscriber of the network operator.

The above information is presented as background information only to assist with an understanding of the present disclosure. No determination has been made, and no assertion is made, as to whether any of the above might be applicable as prior art with regard to the present disclosure.

SUMMARY

As described above, a network operator such as a mobile communication company may provide a WiFi network that only its subscribers may use, and in order to access such a WiFi network, there may be a separate authentication procedure, e.g., inputting an ID and a password.

Thus, a technology that an electronic device automatically performs an authentication operation by using user information, which may be prestored, without a user's setup operation has been recently developed. In order to automatically perform an authentication operation without a user's setup operation, it is possible to perform a query/response process of transmitting and receiving information required for authentication between the electronic device and an Access Point (AP). For example, a WiFi passpoint may transmit external network information, e.g., a Universal Subscriber Identity Module (USIM) information on a mobile phone, by using an Access Network Query Protocol (ANQP). By using a WiFi passpoint technology, the electronic device may perform an ANQP query/response requesting an ANQP server to transmit information to an AP and receiving the information therefrom and attempt to automatically connect to an AP matched with prestored user information.

The electronic device may perform an authentication procedure on all APs located near the electronic device, and the authentication process may need a lot of time when there are many APs near the electronic device.

Various embodiments of the present disclosure provide an electronic device and a method of connecting an electronic device to a network that may decrease an elapsed time in an authentication process when attempting to connect to an AP.

Aspects of the present disclosure are to address at least the above-mentioned problems and/or disadvantages and to provide at least the advantages described below. Accordingly, an aspect of the present disclosure is to provide an electronic device and a method of connecting an electronic device to a network that may increase connectivity when attempting to connect to an AP.

In accordance with an aspect of the present disclosure, an electronic device is provided. The electronic device includes a communication unit configured to communicate with an AP, a controller configured to find at least one AP through the communication unit, and to transmit a query signal to the found at least one AP through the communication unit to request a connection, wherein the controller configures at least one of a maximum number of retransmission times of the query signal and a response standby time of the query signal based on at least one of a number of the found at least one AP and a quality of the found at least one AP.

In accordance with an aspect of the present disclosure, an electronic device is provided. The electronic device includes a communication unit configured to communicate with an Access Point (AP), a controller configured to find at least one passpoint support AP through the communication unit, to select one passpoint support AP from among the found at least one AP, and to transmit an Access Network Query Protocol (ANQP) query signal to the selected one passpoint support AP through the communication unit to request a connection, wherein the controller further configures at least one of a maximum number of retransmission times of the ANQP query signal and a response standby time of the ANQP query signal based on at least one of a number of the found at least one passpoint support AP and a quality of the found at least one passpoint support AP.

In accordance with another aspect of the present disclosure, a method is provided. The method includes finding at least one AP, configuring at least one of a maximum number of retransmission times of a query signal and a response standby time of a query signal based on at least one of a number of the found at least one AP and a quality of the found at least one AP, transmitting the query signal to the found at least one AP, retransmitting the query signal if a response signal is not received within the response standby time after the transmitting of the query signal, receiving the response signal from one of the found at least on AP to which the query signal is transmitted, and connecting to the one of the found at least one AP from which the response signal is received.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
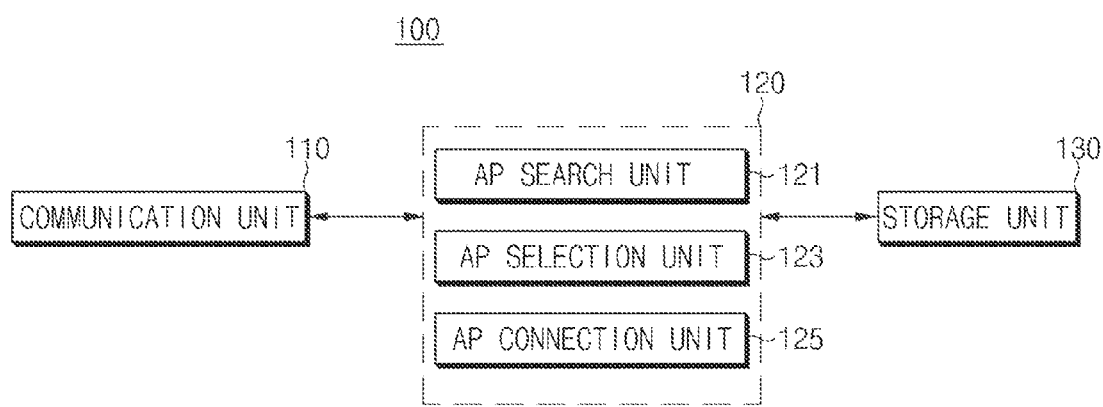
FIG. 1 is a block diagram of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The expression "include" or "may include" that may be used in describing the various embodiments of the present disclosure indicates the presence of a disclosed corresponding function, operation or component but does not exclude one or more functions, operations or components in addition. Furthermore, in describing the various embodiments of the present disclosure, it should be understood that the term "includes" or "has" indicates the presence of characteristics, numbers, steps, operations, components, parts or combinations thereof represented in the present disclosure but does not exclude the presence or addition of one or more other characteristics, numbers, steps, operations, components, parts or combinations thereof.

The expression "or" in the various embodiments of the present disclosure includes any and all combinations of enumerated words. For example, the expression "A or B" may include A, B, or both A and B.

The expression "a first", "a second", "firstly", or "secondly" in the various embodiments of the present disclosure may modify various components of the various embodiments but does not limit corresponding components. For example, the expressions above do not limit the order and/or importance of corresponding components. The expressions above may be used to distinguish one component from another component. For example, both a first user device and a second user device are user devices that are mutually different user devices. For example, without departing from the scope of rights of the various embodiments of the present disclosure, a first component may be called a second component and similarly, the second component may also be called the first component.

When any component is referred to as being "connected" or "accessed" to another component, it should be understood that the former can be "directly connected" to the latter, or there may be another component in between. On the contrary, when any component is referred to as being "directly connected" or "directly accessed" to another component, it should be understood that there may be no other component in between.

The terms used in describing the various embodiments of the present disclosure are used only to describe specific various embodiments and are not intended to limit the present disclosure. The terms in singular form may include the plural form unless otherwise specified.

Unless otherwise defined herein, all terms used herein including technical or scientific terms have the same meanings as those generally understood by a person skilled in the art.

Terms defined in generally used dictionaries should be construed to have meanings matching contextual meanings in the related art and should not be construed as having an ideal or excessively formal meaning unless otherwise defined herein.

An electronic device according to various embodiments of the present disclosure may be a device that includes a communication function. For example, the electronic device may include at least one of a smart phone, a tablet Personal Computer (PC), a mobile phone, a video phone, an e-book reader, a desktop PC, a laptop PC, a net book computer, a Personal Digital Assistant (PDA), a Portable Multimedia Player (PMP), an Motion Picture Expert Group (MPEG) Audio Layer 3 (MP3) player, a mobile medical device, and a camera, a wearable device, e.g., a Head-Mounted-Device (HMD) such as electronic glasses, electronic clothing, an electronic bracelet, an electronic necklace, an electronic appcessory, an electronic tattoo, or a smart watch.

According to some various embodiments, the electronic device may be a smart home appliance having a communication function. The smart home appliance may include, for example, at least one of a Television (TV) set, a Digital Video Disk (DVD) player, an audio set, a refrigerator, an air conditioner, a cleaner, an oven, a microwave oven, a washing machine, an air cleaner, a set-top box, a TV box, e.g., Samsung HomeSync™, Apple TV™, or Google TV™, a game console, an electronic dictionary, an electronic key, a camcorder, and an electronic frame.

According to some various embodiments, the electronic device may include at least one of various medical devices, e.g., a Magnetic Resonance Angiography (MRA) device, a Magnetic Resonance Imaging (MRI) device, a Computed Tomography (CT) device, a camera, and an ultrasonicator, a navigation device, a Global Positioning System (GPS) receiver, an Event Data Recorder (EDR), a Flight Data Recorder (FDR), a car infotainment device, electronic equipment for a ship, e.g., a navigation device for a ship or a gyro compass, avionics, a security device, a head unit for a car, an industrial or home robot, a financial institution's Automated Teller's Machine (ATM) or a store's Point Of Sales (POS).

According to some various embodiments, the electronic device may include at least one of a portion of a building/structure or furniture including a communication function, an electronic board, an electronic signature receiving device, a projector, and various measurement devices, e.g., water, electricity, gas and electric wave measurement devices. An electronic device according to various embodiments of the present disclosure may be one or more combinations of the above-described various devices. Moreover, an electronic device according to various embodiments of the present disclosure may be a flexible device. Moreover, it is obvious to a person skilled in the art that an electronic device according to various embodiments of the present disclosure is not limited to the above-described devices.

Electronic devices according to various embodiments are described below with reference to the accompanying drawings. The term "user" used in various embodiments may refer to a person who uses an electronic device, or a device, e.g., an electronic device having artificial intelligence, that uses an electronic device.

FIG. 1 is a block diagram of an electronic device according to an embodiment of the present disclosure.

Referring to FIG. 1, an electronic device 100 may include a communication unit 110, a control unit 120, and a storage unit 130. The electronic device 100 may be implemented in various devices that may be connected to a network by using a wireless communication network, such as a TV set, a smart phone, a notebook PC, a desktop PC, a tablet PC, and a smart camera.

The communication unit 110 may communication with an Access Point (AP). The communication unit 110 may communicate through a short-range wireless communication network such as an AP and/or a Wireless Fidelity (WiFi) network. To this end, the communication unit 110 may include an antenna (not shown) or a wireless Local Area Network (LAN) card (not shown).

The communication unit 110 may transmit and receive various signals needed for a process of connecting the electronic device 100 to the AP.

The communication unit 110 may receive a beacon signal from an AP when searching for an AP located near the electronic device 100. The beacon signal is a signal predefined between the electronic device 100 and the AP and may include information, e.g., whether the AP supports passpoint, related to the AP. Passpoint mobile devices can automatically discover and connect to Wi-Fi networks powered by passpoint-certified APs. Passpoint was defined by service provider and equipment maker members of the "Wi-Fi Alliance" to address needs for mobile data, streamlined access and subscriber loyalty. Passpoint can enable more efficient service provider data traffic offload to Wi-Fi networks, which is likely to be useful in view if the prevalence of data-intensive applications. The communication unit 110 may transmit a probe request signal to the AP located near the electronic device and receive a probe response signal. A passpoint support AP, or in other words, an AP that supports passpoint, may be an AP that does not require a user to find and authenticate a network each time to which the user connects using the passpoint support AP. The passpoint support AP may use Wi-Fi protected access 2 (WPA2) security and may be certified as being an AP that supports passpoint according to the Wi-Fi Alliance.

The communication unit 110 may transmit a query signal and request a connection, when attempting to connect to the AP. The communication unit 110 may transmit the query signal to a found AP and receive a response signal from the AP. For example, the communication unit 110 may transmit an Access Network Query Protocol (ANQP) query signal and receive an ANQP response signal from an AP that supports passpoint. Alternative protocols to ANQP that provide the same or similar functionality may be used.

The control unit 120 may control the overall operations of the electronic device 100. The control unit 120 may control the communication unit 110 so that the electronic device 100 is connected to the passpoint support AP according to various embodiments of the present disclosure.

Referring to FIG. 1, the control unit 120 may include an AP search unit 121, an AP selection unit 123, and an AP connection unit 125.

The AP search unit 121 may search for at least one passpoint support AP through the communication unit 110. According to an embodiment, the AP search unit 121 may determine whether passpoint is supported by using information included in a beacon signal or a probe response signal, when the beacon signal or the probe response signal is received from at least one AP through the communication unit 110.

The AP search unit 121 may use the beacon signal or the probe response signal to determine the number of passpoint support APs. Also, the AP search unit 121 may use the beacon signal or the probe response signal to determine the quality of passpoint support APs. The AP search unit 121 may use at least one of the Received Signal Strength Indicator (RSSI), Signal-to-Noise Ratio (SNR) and Signal to Interference-plus-Noise Ratio (SINR) of the beacon signal or the probe response signal to check the quality of an AP. In addition, the AP search unit 121 may provide information on the number and quality of passpoint support APs to the AP connection unit 125.

When passpoint support APs are found by the AP search unit 121, the AP connection unit 125 may transmit an ANQP query signal to passpoint support APs that have been found, which may also be referred to as found passpoint support APs, through the communication unit 110. The AP connection unit 125 may use the ANQP query signal to request information (e.g., company information) required for a network connection. When the ANQP response signal is received from the passpoint support APs, the AP connection unit 125 may compare information included in an ANQP response signal with prestored user information and determine whether it is possible to connect to corresponding APs. The AP connection unit 125 may transmit the ANQP query signal to each of the passpoint support APs found by the AP search unit 121 and connect the electronic device 100 to one of connectable APs. In the following, the process of transmitting and receiving the ANQP query signal is defined as an ANQP query/response process.

The AP connection unit 125 may re-transmit the ANQP query signal if the ANQP response signal is not received within a response standby time after the transmission of the ANQP query signal. The AP connection unit 125 may variably set up and/or configure the maximum number of times the ANQP query signal is re-transmitted, hereinafter, referred to as the "maximum number of re-transmission times", and the response standby time of the ANQP query signal based on at least one of the number and quality of found passpoint support APs. The maximum number of re-transmission times and the response standby time may have specific values which may be set up and changed by the manufacturer of the electronic device 100 and a user. In the following, descriptions are made on the assumption that the specific value of the maximum number of re-transmission times is two and the specific value of the response standby time is 200 ms. However, the present disclosure is not limited thereto, and the specific value may be a number, a threshold, a determined value, a predetermined value, a user defined value, or any other similar and/or suitable value.

According to an embodiment, the AP connection unit 125 may increase the maximum number of re-transmission times of the ANQP query signal to a value larger than the specific value when the number of found passpoint support APs is smaller than or equal to a reference value. For example, when the reference value is set to one, the AP connection unit 125 may set the maximum number of re-transmission times of the ANQP query signal to three if the number of found passpoint support APs is one, and set the maximum number of re-transmission times of the ANQP query signal to two being the specific value if the number of found passpoint support APs is greater than or equal to two. That is, when the number of found passpoint support APs is small, it is possible to increase the connectivity of corresponding APs by increasing the maximum number of re-transmission times because the connectivity is more important than an elapsed time in the ANQP query/response process.

According to an embodiment, the AP connection unit 125 may increase the response standby time to a value larger than the specific value when the number of found passpoint support APs is smaller than or equal to the reference value. For example, when the reference value is set to three, the AP connection unit 125 may set the response standby time to 400 ms if the number of found passpoint support APs is smaller than or equal to three, and set the response standby time to 200 ms to be the specific value if the number of found passpoint support APs is greater than or equal to four. That is, when the number of found passpoint support APs is small, it is possible to increase the connectivity of APs by increasing the response standby time because the connectivity is more important than the elapsed time in the ANQP query/response process.

According to an embodiment, the AP connection unit 125 may increase the maximum number of re-transmission times of the ANQP query signal to a value larger than the specific value when the quality, such as a signal quality, of the found passpoint support APs is greater than or equal to a reference value. For example, when the quality of an AP is determined based on a RSSI and the reference value is set to −80 dbm, the AP connection unit 125 may set the maximum number of re-transmission times of the ANQP query signal to three if the RSSI of found passpoint support APs is equal to or higher than −80 dbm, e.g., −70 dbm, and set the maximum number of re-transmission times of the ANQP query signal to two to be the specific value if the RSSI of passpoint support APs is lower than −80 dbm. Even if the quality of found passpoint support APs is greater than or equal to the reference value, it is possible to increase the connectivity of an AP by increasing the maximum number of re-transmission times to a value larger than the specific value because an ANQP response signal may not be received due to a temporary quality decrease or network failure.

According to an embodiment, the AP connection unit 125 may decrease the maximum number of re-transmission times of the ANQP query signal to a value smaller than the specific value when the quality of found passpoint support APs is worse than or equal to the reference value. For example, when the quality of an AP is determined based on the RSSI and the reference value is set to −80 dbm, the AP connection unit 125 may set the maximum number of re-transmission times of the ANQP query signal to one or zero if the RSSI of found passpoint support APs is less than or equal to −80 dbm, e.g., −90 dbm, and set the maximum number of re-transmission times of the ANQP query signal to two being the specific value if the RSSI of passpoint support APs exceeds −80 dbm. That is, when the quality of found passpoint support APs is worse, it is possible to decrease the elapsed time in the ANQP query/response process by decreasing the maximum number of re-transmission times.

According to an embodiment, the AP connection unit 125 may decrease the response standby time to a value smaller than the specific value when the quality of found passpoint support APs is greater than or equal to the reference value. For example, when the quality of an AP is determined based on the RSSI and the reference value is set to −80 dbm, the AP connection unit 125 may set the response standby time to 100 ms if the RSSI of found passpoint support APs is equal to or higher than −80 dbm, and set the response standby time to 200 ms to be the specific value if the RSSI of passpoint support APs is lower than −80 dbm. That is, when the quality of found passpoint support APs is greater than or equal to the reference value, it is possible to decrease the elapsed time in the ANQP query/response process by decreasing the response standby time to a value smaller than the specific value because the reception speed of the ANQP response signal is quick.

Although a case where each of the maximum number of re-transmission times and the response standby time has one reference value is described as an example in the above embodiment, the present disclosure is not limited thereto, and it is possible to set the maximum number of re-transmission times and the response standby time based on one or more reference values, e.g. two reference values.

According to an embodiment, the AP connection unit 125 may increase the maximum number of re-transmission times of the ANQP query signal to a value larger than the specific value when the number of found passpoint support APs is smaller than or equal to a first reference value, set the maximum number of re-transmission times to the specific value when the number of found passpoint support APs is between the first reference value and a second reference value, and decrease the maximum number of re-transmission times to a value smaller than the specific value when the number of found passpoint support APs is greater than or equal to the second reference value. That is, when the number of found passpoint support APs is small, it is possible to increase the connectivity of corresponding APs by increasing the maximum number of re-transmission times because the connectivity is more important than the elapsed time in the connection process, and when the number of found passpoint support APs is large, it is possible to decrease the elapsed time in the connection process by decreasing the maximum number of re-transmission times.

According to an embodiment, the AP connection unit 125 may increase the response standby time to a value larger than the specific value when the number of found passpoint support APs is smaller than or equal to the first reference value, set the response standby time to the specific value when the number of found passpoint support APs is between the first reference value and the second reference value, and decrease the response standby time to a value smaller than the specific value when the number of found passpoint support APs is greater than or equal to the second reference value. That is, when the number of found passpoint support APs is small, it is possible to increase the connectivity of corresponding APs by increasing the response standby time because the connectivity is more important than the elapsed time in the connection process, and when the number of found passpoint support APs is large, it is possible to decrease the elapsed time in the connection process by decreasing the response standby time.

According to an embodiment, the AP connection unit 125 may increase the maximum number of re-transmission times of the ANQP query signal to a value larger than the specific value when the quality of found passpoint support APs is greater than or equal to a first reference value, set the maximum number of re-transmission times to the specific value when the quality of found passpoint support APs is between the first reference value and a second reference value, and decrease the maximum number of re-transmission times to a value smaller than the specific value when the quality of found passpoint support APs is less than or equal to the second reference value.

According to an embodiment, when setting the maximum number of re-transmission times and the response standby time based on the quality of found passpoint support APs, it is possible to equally set the maximum numbers of re-transmission times and the response standby times of all passpoint support APs based on the average quality of found passpoint support APs. Alternatively, it is also possible to individually set the maximum number of re-transmission times and response standby time of passpoint support APs based on the quality of each of found passpoint support APs.

The AP selection unit 123 may select some of the passpoint support APs found by the AP search unit 121. According to an embodiment, the AP selection unit 123 may select APs that have qualities equal to or higher than a preset reference level, from among APs found by the AP search unit 121. That is, the AP selection unit 123 may exclude APs that are determined to be impossible to connect or that have lower quality, from among the passpoint support APs found by the AP search unit 121.

The AP selection unit 123 may exclude APs that are included in a list of excluded targets, stored in the storage unit 130. The list of excluded targets may include information on APs to which the electronic device 100 may connect, or company information.

The AP selection unit 123 may select only APs that are included in the list of allowed targets stored in the storage unit 130. The list of allowed targets may include information on APs or companies which the electronic device 100 may connect.

The AP connection unit 125 may transmit an ANQP query signal to only APs selected by the AP selection unit 123 and receive an ANQP response signal. Thus, since an ANQP query/response process is not performed on APs that are determined to be impossible to connect or that have low quality, from among the passpoint support APs found by the AP search unit 121, it is possible to decrease an elapsed time in a network connection process.

When the ANQP response signal is received from the AP selected by the AP selection unit 123, the AP connection unit 125 may compare company information included in the ANQP response signal with user information stored in the storage unit 130 and determine whether it is possible to connect. The AP connection unit 125 may add information on connectable APs or companies to the list of allowed targets stored in the storage unit 130 or add information on APs or companies that are determined to be impossible (or difficult) to connect to the list of excluded targets stored in the storage unit 130.

The storage unit 130 may store user information. Also, the storage unit 130 may store the list of allowed targets and the list of excluded targets. The list of allowed targets and the list of excluded targets stored in the storage unit 130 may be updated by the AP connection unit 125.

The electronic device 100 according to various embodiments of the present disclosure includes the communication unit 110 that communicates with the AP, the AP search unit 121 that searches for at least one AP through the communication unit 110, and the AP connection unit 125 that transmits a query signal to the AP found through the communication unit to request a connection, wherein the AP connection unit 125 may variably set the maximum number of re-transmission times and the response standby time of the query signal based on at least one of the number and quality of found APs.

In the following, effects provided by various embodiments of the present disclosure are described with reference to Tables 1 to 5. Tables 1 to 4 represent times spent from when an ANQP query signal is transmitted to when an ANQP response signal is received, for each of passpoint support APs located near a terminal device. The measurement result of each of Tables 1 to 4 is obtained by performing experiments three times at the same place.

TABLE 1

| BSSID | Intensity of Received Signal | SSID | Carrier Frequency | ANQP Qery Request Response Time | | |
|---|---|---|---|---|---|---|
| | | | | First | Second | Third |
| 06:30:0D:83:7B:02 | rssi = −74 | ssid = T wifi zone_secure | frequency = 2412 | 335 ms | | |
| 0A:30:0D:83:9E:92 | rssi = −84 | ssid = T wifi zone_secure | frequency = 5745 | 35 ms | 20 ms | 750 ms |
| 0A:30:0D:83:7B:12 | rssi = −78 | ssid = T wifi zone_secure | frequency = 5745 | 70 ms | 30 ms | 20 ms |
| 06:30:0D:83:8B:E2 | rssi = −80 | ssid = T wifi zone_secure | frequency = 2412 | | | 280 ms |
| 0A:30:0D:83:8A:52 | rssi = −84 | ssid = T wifi zone_secure | frequency = 5260 | 25 ms | 235 ms | |
| 0A:30:0D:83:8C:F2 | rssi = −80 | ssid = T wifi zone_secure | frequency = 5500 | 235 ms | 25 ms | 35 ms |
| 0A:30:0D:83:74:92 | rssi = −78 | ssid = T wifi zone_secure | frequency = 5260 | | 25 ms | 25 ms |
| 06:30:0D:83:92:C2 | rssi = −57 | ssid =T wifi zone_secure | frequency = 2412 | 35 ms | 35 ms | 70 ms |
| 06:30:0D:83:8C:E2 | rssi = −66 | ssid = T wifi zone_secure | frequency = 2432 | 45 ms | 35 ms | 30 ms |
| 06:30:0D:83:74:82 | rssi = −73 | ssid = T wifi zone_secure | frequency = 2452 | | | 35 ms |
| 0A:30:0D:83:92:D2 | rssi = −76 | ssid = T wifi zone_secure | frequency = 5500 | 25 ms | 25 ms | |
| 0A:30:0D:83:88:F2 | rssi = −86 | ssid = T wifi zone_secure | frequency = 5500 | 30 ms | 35 ms | |
| 0A:30:0D:83:6D:82 | rssi = −90 | ssid = T wifi zone_secure | frequency = 5560 | 35 ms | 710 ms | |
| 06:30:0D:83:8B:E2 | rssi = −86 | ssid = T wifi zone_secure | frequency = 2432 | 835 ms | 2025 ms | |
| 06:30:0D:83:6D:A2 | rssi = −84 | ssid = T wifi zone_secure | frequency = 2452 | | 4025 ms | |

TABLE 1-continued

| | Intensity of Received Signal | | Carrier | ANQP Qery Request Response Time | | |
|---|---|---|---|---|---|---|
| BSSID | | SSID | Frequency | First | Second | Third |
| 06:30:0D:83:9E:82 | rssi = −78 | ssid = T wifi zone_secure | frequency = 2452 | 275 ms | 35 ms | 545 ms |
| 0A:30:0D:83:8B:F2 | rssi = −85 | ssid = T wifi zone_secure | frequency = 5500 | | | 30 ms |
| | | | Total Elapsed Time | 2000 | 7295 | 1820 |

Table 1 represents a result of measuring an elapsed time in an ANQP query/response process according to related art. That is, Table 1 represents elapsed times when the ANQP query/response process is performed without the limitations of the maximum number of re-transmission times and the response standby time, on all APs located near the terminal device. Referring to Table 1, it may be seen that in the experiments, seventeen passpoint support APs are found near the terminal device. In a first experiment, twelve passpoint support APs are found, in a second experiment, thirteen passpoint support APs are found, and in a third experiment, ten passpoint support APs are found. It may be seen that the total elapsed times from when an ANQP query signal is transmitted to each AP to when an ANQP response signal is received from each AP are measured as 2000 ms, 7295 ms, and 1820 ms.

Table 2 is a result of performing a measurement by setting up the maximum number of re-transmission times of an ANQP query signal to one when the RSSI of found passpoint support APs is less than or equal to −70 dbm, and by setting up the maximum number of re-transmission times of an ANQP query signal to two being a specific value when the RSSI of found passpoint support APs exceeds −70 dbm.

Referring to Table 2, it may be seen that in the experiments, sixteen passpoint support APs that exclude a fourth AP of Table 1 are found near the terminal device. In a first experiment, eleven passpoint support APs are found, in a second experiment, eleven passpoint support APs are found, and in a third experiment, fourteen passpoint support APs

TABLE 2

| | Intensity of Received Signal | | Carrier | ANQP Qery Request Response Time | | |
|---|---|---|---|---|---|---|
| BSSID | | SSID | Frequency | First | Second | Third |
| 06:30:0D:83:7B:02 | rssi = −74 | ssid = T wifi zone_secure | frequency = 2412 | 50 ms | 400 ms | 220 ms |
| 0A:30:0D:83:9E:92 | rssi = −84 | ssid = T wifi zone_secure | frequency = 5745 | 35 ms | 400 ms | 50 ms |
| 0A:30:0D:83:7B:12 | rssi = −78 | ssid = T wifi zone_secure | frequency = 5745 | 30 ms | | 25 ms |
| 06:30:0D:83:8B:E2 | rssi = −80 | ssid = T wifi zone_secure | frequency = 2412 | | | |
| 0A:30:0D:83:8A:52 | rssi = −84 | ssid = T wifi zone_secure | frequency = 5260 | 200 ms | | 125 ms |
| 0A:30:0D:83:8C:F2 | rssi = −80 | ssid = T wifi zone_secure | frequency = 5500 | 30 ms | 30 ms | 35 ms |
| 0A:30:0D:83:74:92 | rssi = −78 | ssid = T wifi zone_secure | frequency = 5260 | 35 ms | 25 ms | 40 ms |
| 06:30:0D:83:92:C2 | rssi = −57 | ssid = T wifi zone_secure | frequency = 2412 | 100 ms | 35 ms | 25 ms |
| 06:30:0D:83:8C:E2 | rssi = −66 | ssid = T wifi zone_secure | frequency = 2432 | 115 ms | 120 ms | 25 ms |
| 06:30:0D:83:74:82 | rssi = −73 | ssid = T wifi zone_secure | frequency = 2452 | | 30 ms | |
| 0A:30:0D:83:92:D2 | rssi = −76 | ssid = T wifi zone_secure | frequency = 5500 | 30 ms | 25 ms | 25 ms |
| 0A:30:0D:83:88:F2 | rssi = −86 | ssid = T wifi zone_secure | frequency = 5500 | | 40 ms | 35 ms |
| 0A:30:0D:83:6D:B2 | rssi = −90 | ssid = T wifi zone_secure | frequency = 5560 | 400 ms | | |
| 06:30:0D:83:8B:E2 | rssi = −86 | ssid = T wifi zone_secure | frequency = 2432 | | 400 ms | 400 ms |
| 06:30:0D:83:6D:A2 | rssi = −84 | ssid = T wifi zone_secure | frequency = 2452 | 400 ms | | 400 ms |
| 06:30:0D:83:9E:82 | rssi = −78 | ssid = T wifi zone_secure | frequency = 2452 | | | 400 ms |
| 0A:30:0D:83:8B:F2 | rssi = −85 | ssid = T wifi zone_secure | frequency = 5500 | | 400 ms | 400 ms |
| | | | Total Elapsed Time | 1425 | 3820 | 2205 |

Table 2 represents a result of measuring an elapsed time in an ANQP query/response process according to an embodiment of the present disclosure. Table 2 represents an experiment example in which the maximum number of re-transmission times is variably set up depending on the qualities of passpoint support APs.

are found. It may be seen that the total elapsed times from when the ANQP query signal is transmitted to each AP to when the ANQP response signal is received from each AP are measured as 1425 ms, 3820 ms, and 2205 ms. When comparing the measurement result of Table 2 with that of Table 1, it may be seen that the elapsed time in the ANQP query/response process decreases.

TABLE 3

| BSSID | RSSI | SSID | Carrier Frequency | First | Second | Third |
|---|---|---|---|---|---|---|
| 06:30:0D:83:7B:02 | rssi = −74 | ssid = T wifi zone_secure | frequency = 2412 |  | 400 ms |  |
| 0A:30:0D:83:9E:92 | rssi = −84 | ssid = T wifi zone_secure | frequency = 5745 |  |  |  |
| 0A:30:0D:83:7B:12 | rssi = −78 | ssid = T wifi zone_secure | frequency = 5745 | 30 ms |  | 25 ms |
| 06:30:0D:83:88:E2 | rssi = −80 | ssid = T wifi zone_secure | frequency = 2412 |  |  |  |
| 0A:30:0D:83:8A:52 | rssi = −84 | ssid = T wifi zone_secure | frequency = 5260 |  |  |  |
| 0A:30:0D:83:8C:F2 | rssi = −80 | ssid = T wifi zone_secure | frequency = 5500 |  |  |  |
| 0A:30:0D:83:74:92 | rssi = −78 | ssid = T wifi zone_secure | frequency = 5260 | 40 ms | 25 ms |  |
| 06:30:0D:83:92:C2 | rssi = −57 | ssid = T wifi zone_secure | frequency = 2412 | 35 ms | 30 ms | 35 ms |
| 06:30:0D:83:8C:E2 | rssi = −66 | ssid = T wifi zone_secure | frequency = 2432 | 35 ms | 50 ms | 50 ms |
| 06:30:0D:83:74:82 | rssi = −73 | ssid = T wifi zone_secure | frequency = 2452 | 25 ms | 35 ms |  |
| 0A:30:0D:83:92:D2 | rssi = −76 | ssid = T wifi zone_secure | frequency = 5500 |  | 25 ms | 25 ms |
| 0A:30:0D:83:88:F2 | rssi = −86 | ssid = T wifi zone_secure | frequency = 5500 |  |  |  |
| 0A:30:0D:83:6D:B2 | rssi = −90 | ssid = T wifi zone_secure | frequency = 5560 |  |  |  |
| 06:30:0D:83:8B:E2 | rssi = −86 | ssid = T wifi zone_secure | frequency = 2432 |  |  |  |
| 06:30:0D:83:6D:A2 | rssi = −84 | ssid = T wifi zone_secure | frequency = 2452 |  |  |  |
| 06:30:0D:83:9E:82 | rssi = −78 | ssid = T wifi zone_secure | frequency = 2452 | 400 ms |  | 400 ms |
| 0A:30:0D:83:8B:F2 | rssi = −85 | ssid = T wifi zone_secure | frequency = 5500 |  |  |  |
| Total Elapsed Time |  |  |  | 565 | 565 | 535 |

Table 3 represents a result of measuring an elapsed time in an ANQP query/response process according to another embodiment of the present disclosure. In particular, Table 3 represents a case where depending on the qualities of passpoint support APs, some APs are selected and the maximum number of re-transmission times is variably set up.

APs are selected. It may be seen that the total elapsed times from when the ANQP query signal is transmitted to selected APs to when the ANQP response signal is received from selected APs are measured as 565 ms, 565 ms, and 535 ms. Comparing the measurement result of Table 3 with that of Table 1, it may be seen that the elapsed time in the ANQP query/response process may decrease.

TABLE 4

| BSSID | RSSI | SSID | Carrier Frequency | First | Second | Third |
|---|---|---|---|---|---|---|
| 06:30:0D:83:7B:02 | rssi = −74 | ssid = T wifi zone_secure | frequency = 2412 | 50 ms |  |  |
| 0A:30:0D:83:9E:92 | rssi = −84 | ssid = T wifi zone_secure | frequency = 5745 |  |  |  |
| 0A:30:0D:83:7B:12 | rssi = −78 | ssid = T wifi zone_secure | frequency = 5745 | 50 ms | 35 ms | 35 ms |
| 06:30:0D:83:8B:E2 | rssi = −80 | ssid = T wifi zone_secure | frequency = 2412 |  |  |  |
| 0A:30:0D:83:8A:52 | rssi = −84 | ssid = T wifi zone_secure | frequency = 5260 |  |  |  |
| 0A:30:0D:83:8C:F2 | rssi = −80 | ssid = T wifi zone_secure | frequency = 5500 |  |  |  |
| 0A:30:0D:83:74:92 | rssi = −78 | ssid = T wifi zone_secure | frequency = 5260 | 35 ms |  | 35 ms |
| 06:30:0D:83:92:C2 | rssi = −57 | ssid = T wifi zone_secure | frequency = 2412 | 30 ms | 35 ms | 35 ms |
| 06:30:0D:83:8C:E2 | rssi = −66 | ssid = T wifi zone_secure | frequency = 2432 | 30 ms | 30 ms | 50 ms |
| 06:30:0D:83:74:82 | rssi = −73 | ssid = T wifi zone_secure | frequency = 2452 |  | 35 ms |  |
| 0A:30:0D:83:92:D2 | rssi = −76 | ssid = T wifi zone_secure | frequency = 5500 | 25 ms | 25 ms | 25 ms |
| 0A:30:0D:83:88:F2 | rssi = −86 | ssid = T wifi zone_secure | frequency = 5500 |  |  |  |
| 0A:30:0D:83:6D:B2 | rssi = −90 | ssid = T wifi zone_secure | frequency = 5560 |  |  |  |
| 06:30:0D:83:8B:E2 | rssi = −86 | ssid = T wifi zone_secure | frequency = 2432 |  |  |  |
| 06:30:0D:83:6D:A2 | rssi = −84 | ssid = T wifi zone_secure | frequency = 2452 |  |  |  |
| 06:30:0D:83:9E:82 | rssi = −78 | ssid = T wifi zone_secure | frequency = 2452 |  |  |  |
| 0A:30:0D:83:8B:F2 | rssi = −85 | ssid = T wifi zone_secure | frequency = 5500 |  |  |  |
| Total Elapsed Time |  |  |  | 220 | 160 | 180 |

Table 3 is a result of performing a measurement by setting up the maximum number of re-transmission times of an ANQP query signal to one when the RSSI of passpoint support APs that are selected excluding APs having the RSSI less than or equal to −80 dbm from among found passpoint support APs is less than or equal to −70 dbm, and by setting up the maximum number of re-transmission times to two being a specific value when the RSSI of passpoint support APs exceeds −70 dbm.

Referring to Table 3, it may be seen that in a first experiment, six of found passpoint support APs are selected, in a second experiment, six passpoint support APs are selected, and in a third experiment, five passpoint support Table 4 represents a result of measuring an elapsed time in an ANQP query/response process according to another embodiment of the present disclosure. Table 4 represents a case where, depending on the qualities of each of passpoint support APs, some APs are selected and the maximum number of re-transmission times and a response standby time are variably set up.

In the experiment example shown in Table 4, APs having an RSSI lower than to equal to −80 dbm, from among found passpoint support APs, are excluded. In addition, when the RSSI of selected passpoint support APs is less than or equal to −70 dbm, the maximum number of re-transmission times of an ANQP query signal is set to zero, and when the RSSI of selected passpoint support APs exceeds −70 dbm, the maximum number of re-transmission times is set to two. Also, when measuring, the response standby time of selected passpoint support APs is set to 50 ms.

Referring to Table 4, it may be seen that a sixteenth AP is not found in the experiment even though the intensity of its reception signal exceeds −80 dbm. It may be seen that in a first experiment, six found passpoint support APs are selected, in a second experiment, five passpoint support APs are selected, and in a third experiment, five passpoint support APs are selected. It may be seen that the total elapsed times from when the ANQP query signal is transmitted to selected APs to when the ANQP response signal is received from selected APs are measured as 220 ms, 160 ms, and 180 ms. Comparing the measurement result of Table 4 with that of Table 1, it may be seen that the elapsed time in the ANQP query/response process may decrease.

TABLE 5

| Applied Technique | Elapsed Time for ANQP Discovery (unit: ms) | | | | |
|---|---|---|---|---|---|
| | First Trial | Second Trial | Third Trial | Average | Improved Rate |
| Related Art | 2000 | 7295 | 1820 | 3705 | — |
| When only number of ANQP re-transmission times is adjusted | 1425 | 3820 | 2205 | 2483 | 33% |
| When number of ANQP re-transmission times is adjusted after excluding APs less than or equal to a specific wireless quality | 565 | 565 | 535 | 555 | 85% |
| When number of ANQP re-transmission times and response standby time are adjusted after excluding APs less than or equal to a specific wireless quality | 220 | 160 | 180 | 187 | 95% |

Table 5 represents a result of measuring elapsed times in an ANQP query/response process according to various embodiments of a related art and the present disclosure.

Table 5 provides the measurement result and average of elapsed times in the ANQP query/response process discussed with reference to Tables 1 to 4. Also, a measurement result according to an embodiment of the present disclosure provides an improvement rate against a related art.

According to the related art, the elapsed times in the ANQP query/response process are 2000 ms, 7295 ms, and 1820 ms and the average elapsed time is 3705 ms.

According to an experiment of adjusting the number of re-transmission times of an ANQP query signal shown in Table 2, the elapsed times in the ANQP query/response process are 1425 ms, 3820 ms, and 2205 ms and the average elapsed time is 2483 ms. It may be seen that the improvement rate against the related art is 33%.

According to an experiment of adjusting the number of re-transmission times of the ANQP query signal after selecting specific APs shown in Table 3, the elapsed times in the ANQP query/response process are 565 ms, 565 ms, and 535 ms and the average elapsed time is 555 ms. It may be seen that the improvement rate against the related art is 85%.

According to an experiment of adjusting the number of re-transmission times and response standby time of the ANQP query signal after selecting specific APs shown in Table 4, the elapsed times in the ANQP query/response process are 220 ms, 160 ms, and 180 ms and the average elapsed time is 187 ms. It may be seen that the improvement rate against the related art is 95%.

According to the above-described result, it may be seen that when selecting some of passpoint support APs, both cases of adjusting the number of re-transmission times of the ANQP query signal and of adjusting the response standby time may decrease a time in comparison with the related art.

Figure 2:
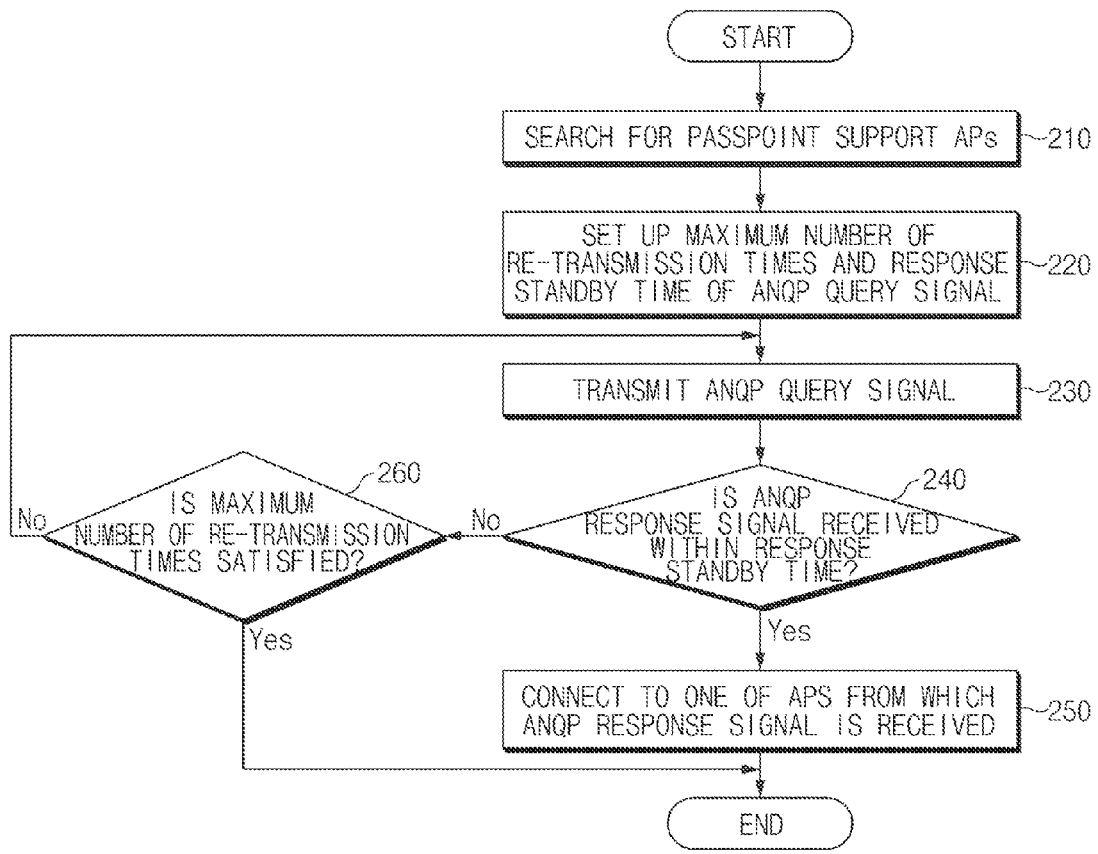
FIG. 2 is a flow chart of a method of connecting an electronic device to a network according to an embodiment of the present disclosure.

FIG. 2 is a flow chart of a method of connecting an electronic device to a network according to an embodiment of the present disclosure.

The operations of FIG. 2 may be performed by e.g., a user device, such as an electronic device 100. In operation 210, the electronic device 100 may search for passpoint support APs. The electronic device 100 may determine whether passpoint is supported by using information included in a beacon signal or a probe response signal, when the beacon signal or the probe response signal is received from at least one AP. The electronic device 100 may use the beacon signal or the probe response signal to determine the number of passpoint support APs. Also, the electronic device 100 may use the beacon signal or the probe response signal to determine the qualities of passpoint support APs.

In operation 220, the electronic device 100 may set up at least one of the maximum number of re-transmission times and response standby time of an ANQP query signal. The electronic device 100 may variably set up the maximum number of retransmission times of the ANQP query signal and the response standby time of the ANQP query signal based on at least one of the number and quality of found passpoint support APs.

For example, when the number of found APs is smaller than or equal to a preset value, it is possible to increase the maximum number of re-transmission times of the ANQP query signal to a value larger than a specific value. For another example, when the number of found APs is smaller than or equal to the preset value, which may be another specific value, it is possible to increase the response standby time to a value larger than a specific value. For another example, when the quality of found APs is equal to or higher than a preset reference level, it is possible to increase the maximum number of re-transmission times of the ANQP query signal to a value larger than a specific value. For another example, when the quality of found APs is less than or equal to the preset reference value, it is possible to decrease the maximum number of re-transmission times of the ANQP query signal to a value smaller than the specific value. For another example, when the quality of found APs is equal to or higher than the preset reference level, it is possible to decrease the response standby time to a value smaller than the specific value.

In operation 230, the electronic device 100 may transmit the ANQP query signal to found passpoint support APs. In operation 240, the electronic device 100 may determine whether an ANQP response signal is received, within the response standby time, from an AP to which the ANQP query signal is transmitted. When the ANQP response signal is received within the response standby time in operation 240, the electronic device 100 may connect to one of APs that transmits the ANQP response signal that is received by the electronic device 100 in operation 250. When the ANQP response signal is not received within the response standby time in operation 240, the electronic device 100 may determine whether the maximum number of re-transmission times is satisfied in operation 260. When the maximum number of re-transmission times is not satisfied in operation 260, it is possible to again transmit, or, in other words, retransmit, the ANQP query signal in operation 230. When the maximum number of re-transmission times is satisfied, or, in other words, is reached, in operation 260, the procedure is ended and no connectable AP is found.

The electronic device 100 may transmit the ANQP query signal to found passpoint support APs by using a unicast technique. That is, it may perform operations 230, 240 and 260 on each of found passpoint support APs and connect to one of Aps from which the ANQP response signal is received.

In order to connect the electronic device 100 to a network, it is possible to select some of passpoint support APs found in operation 210 and transmit the ANQP query signal to selected passpoint support APs.

When selecting some of passpoint support APs, the electronic device 100 may determine the qualities of found passpoint support APs and select APs satisfying a preset quality. According to various embodiments, it is possible to exclude APs that are included in a prestored list of excluded targets from found passpoint support APs. According to various embodiments, it is possible to select APs that are included in a prestored list of allowed targets, from found passpoint support APs.

According to the above-described various embodiments, the electronic device 100 may decrease the elapsed time in the ANQP query/response process and increase the network connectivity of passpoint support AP.

A method according to various embodiments of the present disclosure may include searching for at least one AP, setting up at least one of the maximum number of re-transmission times and response standby time of a query signal based on at least one of the number and quality of found APs, transmitting the query signal to found APs, re-transmitting the query signal when a response signal is not received within the response standby time after transmitting the query signal, receiving the response signal from the APs to which the query signal is transmitted, connecting one of the APs from which the response signal is received.

Figure 3:
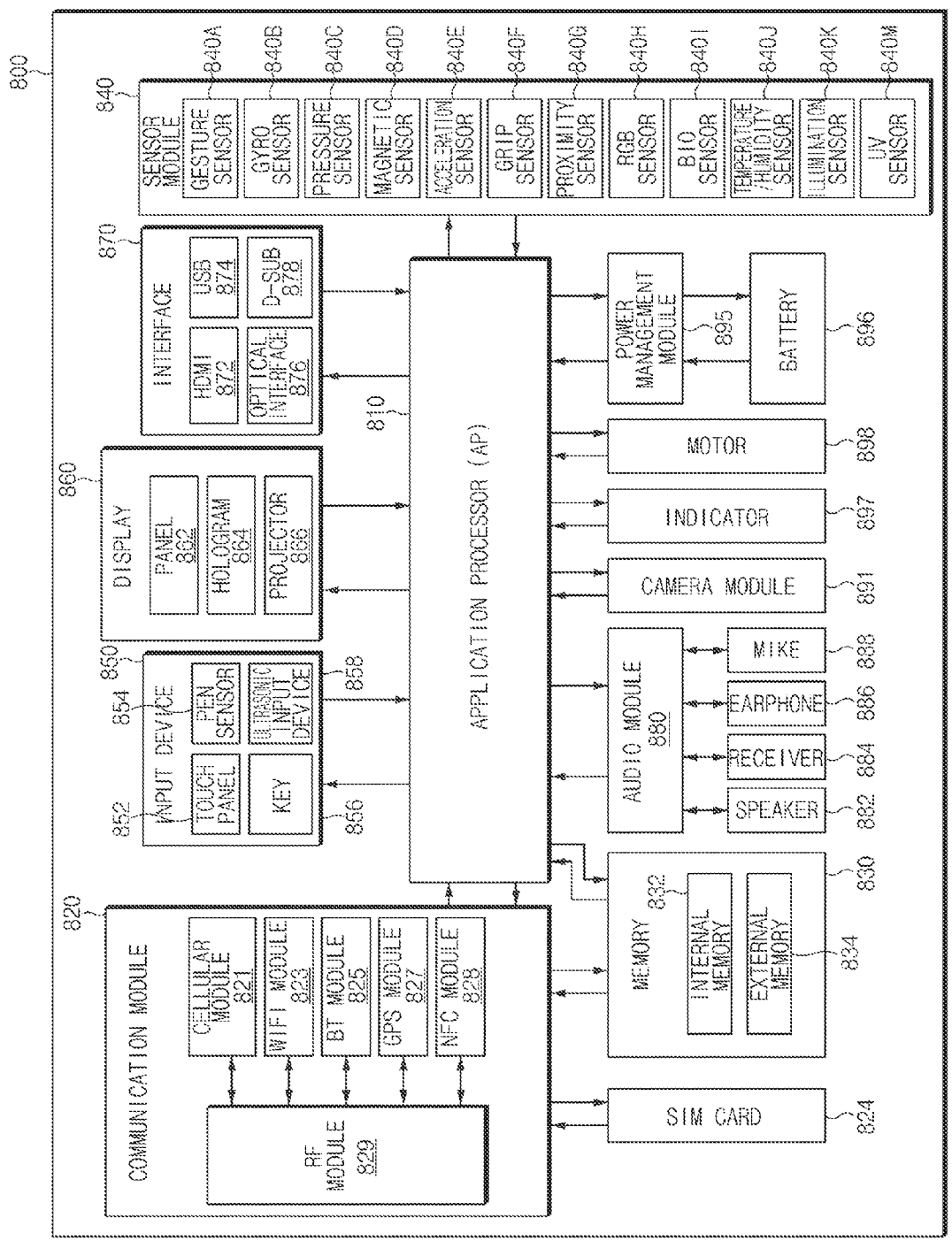
FIG. 3 is a block diagram of an electronic device according to an embodiment of the present disclosure.

FIG. 3 is a block diagram of an electronic device 800 according to an embodiment of the present disclosure. The electronic device 800 may include all or some of the electronic device 100 shown in FIG. 1. Referring to FIG. 3, the electronic device 800 may include one or more Application Processors 810, a communication module 820, a Subscriber Identification Module (SIM) card 824, a memory 830, a sensor module 840, an input device 850, a display 860, an interface 870, an audio module 880, a camera module 891, a power management module 895, a battery 896, an indicator 897, and a motor 898.

The Application Processor 810 may execute an operating system or application programs to control a plurality of hardware and software components connected to the Application Processor 810 and may perform processing and calculation on various pieces of data including multimedia data. The Application Processor 810 may be implanted in a System on Chip (SoC) for example. According to an embodiment, the Application Processor 810 may further include a Graphic Processing Unit (GPU) (not shown).

The communication module 820, e.g., the communication unit 110, may perform data transmission and reception in communication between the electronic device 800, e.g., the electronic device 100, and other electronic devices connected thereto through a network. According to an embodiment, the communication module 820 may include a cellular module 821, a WiFi module 823, a BT module 825, a GPS module 827, an NFC module 828, and a Radio Frequency (RF) module 829.

The cellular module 821 may provide a voice call, a video call, a message service, or an internet service through a communication network, such as an Long Term Evolution (LTE) network, an LTE-Advanced (LTE-A) network, a Code Division Multiple Access CDMA network, a Wideband-CDMA (WCDMA) network, a Universal Mobile Telecommunications System (UMTS) network, a Wireless Broadband (WiBro) network or a Global System for Mobile communications (GSM) network. Also, the cellular module 821 may use e.g., a subscriber identification module, such as the SIM card 824, to identify and authenticate electronic devices in the communication network. According to an embodiment, the cellular module 821 may perform at least some of functions that the Application Processor 810 may provide. For example, the cellular module 821 may perform at least some of multimedia control functions.

The cellular module 821 may include a Communication Processor (CP). Also, the cellular module 821 may be implemented in a SoC for example. FIG. 3 shows components such as the cellular module 821, such as a communication processor, the memory 830 and the power management module 895 separately from the Application Processor 810, but the present disclosures is not limited thereto, and according to an embodiment, the Application Processor 810 may be implemented to include at least some, such as a cellular module 821, of the above-described components.

According to an embodiment, the Application Processor 810 or the cellular module 821, such as a communication processor, may load, on volatile memories, commands or data received from non-volatile memories connected to the Application Processor 810 or the cellular module 821 or from at least one of other components, and may process the commands or data. Also the Application Processor 810 or the cellular module 821 may store, in non-volatile memories, data received from at least one of other components or generated by at least one of other components.

The WiFi module 823, the BT module 825, the GPS module 827 or the NFC module 828 may include a processor (not shown) for processing data transmitted and received through a corresponding module, for example. FIG. 3 shows each of the cellular module 821, the WiFi module 823, the BT module 825, the GPS module 827, and the NFC module 828 as a separate block, but the present disclosure is not limited thereto, and according to an embodiment, at least some, e.g., two or more, of the cellular module 821, the WiFi module 823, the BT module 825, the GPS module 827, and the NFC module 828 may be included in one Integrated Circuit (IC) or an IC package. For example, some of the processors, such as the communication processor corresponding to the cellular module 821 and a WiFi processor corresponding to the WiFi module 823, corresponding to the cellular module 821, the WiFi module 823, the BT module 825, the GPS module 827, and the NFC module 828, respectively may be implemented in one SoC.

The RF module 829 may perform data transmission and reception, namely, transmit and receive an RF signal. The RF module 829 may include e.g., a transceiver, a Power Amp Module (PAM), a frequency filter or a Low Noise Amplifier (LNA), though not shown. Also, the RF module 829 may further include a part, such as a conductor or wire, for transmitting or receiving electromagnetic waves in a free space when performing wireless communication. Although FIG. 3 shows that the cellular module 821, the WiFi module 823, the BT module 825, the GPS module 827, and the NFC module 828 share one RF module 829, at least one of the cellular module 821, the WiFi module 823, the BT module 825, the GPS module 827, and the NFC module 828 may transmit and receive an RF signal through a separate RF module according to an embodiment.

The SIM card 824 may be a card including a subscriber identification module and may be inserted into a slot that is formed on a specific part of an electronic device. The SIM card 824 may include unique identification information, such as an Integrated Circuit Card Identifier (ICCID), or subscriber information, such as an International Mobile Subscriber Identity (IMSI).

The memory 830, such as the storage unit 130, may include an internal memory 832 or an external memory 834. The internal memory 830 may include at least one of a volatile memory, such as a Random Access Memory (RAM), a Dynamic RAM (DRAM), a Static RAM (SRAM), or a Synchronous Dynamic RAM (SDRAM)) and a non-volatile memory, such as an One Time Programmable ROM (OTPROM), a Programmable ROM (PROM), an Erasable and Programmable ROM (EPROM), an Electrically Erasable and Programmable ROM (EEPROM), a mask ROM, a flash ROM, a NAND flash memory, or a NOR flash memory.

According to an embodiment, the internal memory 832 may be a Solid State Drive (SSD). The external memory 834 may further include a flash drive, such as a Compact Flash (CF) memory card, a Secure Digital (SD) memory card, a micro Secure Digital (micro-SD) memory card, a mini Secure Digital (mini-SD) memory card, an extreme Digital (xD) memory card, or a memory stick. The external memory may be functionally connected to the electronic device 800 through various interfaces. According to an embodiment, the electronic device 800 may further include a storage device or storage medium, such as a Hard Disk Drive (HDD).

The sensor module 840 may measure a physical quantity or sense the operation state of the electronic device 800 to convert measured or sensed information into an electrical signal. The sensor module 840 may include at least one of a gesture sensor 840A, a gyro sensor 840B, a pressure sensor 840C, a magnetic sensor 840D, an acceleration sensor 840E, a grip sensor 840F, a proximity sensor 840G, an RGB sensor 840H, a bio sensor 840I, a temperature/humidity sensor 840J, an illumination sensor 840K, and an Ultra Violet (UV) sensor 840M, for example. Additionally or alternatively, the sensor module 840 may include an E-nose sensor (not shown), an Electromyography (EMG) sensor (not shown), an Electroencephalogram (EEG) sensor (not shown), an Electrocardiogram (ECG) sensor (not shown), an Infrared (IR) sensor (not shown), an iris sensor or a fingerprint sensor (not shown). The sensor module 840 may further include a control circuit for controlling at least one sensor that is included in the sensor module 840.

The input device 850 may include a touch panel 852, a pen sensor 854, a key 856 or an ultrasonic input device 858. The touch panel 852 may recognize a touch input by using at least one of capacitive, pressure-sensitive, infrared or ultrasonic techniques, for example. Also, the touch panel 852 may also further include a control circuit (not shown). In the case of the capacitive technique, a physical contact or proximity recognition is possible. The touch panel 852 may also further include a tactile layer (not shown). In this case, the touch panel 852 may provide a tactile response to a user.

The pen sensor 854 may be implemented by using the same or similar method as that of obtaining a user's touch input or by using a separate sheet for recognition. The key 856 may include a physical button, an optical key or a keypad. The ultrasonic input device 858 is a device that may sense a sound wave with a microphone, e.g., a microphone 888, in the electronic device 800 and check data, through an input tool generating an ultrasonic signal, and the ultrasonic input device 858 may perform wireless recognition. According to an embodiment, the electronic device 800 may also receive a user input from an external device, e.g., a computer or a server, connected thereto by using the communication module 820.

The display 860 may include a panel 862, a hologram 864 or a projector 866. The panel 862 may be a Liquid-Crystal Display (LCD) or an Active-Matrix Organic Light-Emitting Diode (AM-OLED), for example. The panel 862 may be implemented flexibly, transparently or wearably, for example. The panel 862 may be integrated into the touch panel 852 so that they are implemented in one module. The hologram 864 may be a device that uses the interference of a light to show a stereoscopic image in the air. The projector 866 may project a light onto a screen to display an image. The screen may be located inside or outside the electronic device 800, for example. According to an embodiment, the display 860 may further include a control circuit (not shown) for controlling the panel 862, the hologram 864 or the projector 866.

The interface 870 may include a High-Definition Multimedia Interface (HDMI) 872, a Universal Serial Bus (USB) 874, an optical interface 876 or a D-subminiature (D-sub) 878. Additionally or alternatively, the interface 870 may include a Mobile High-definition Link (MHL) interface, an SD card/Multi-Media Card (MMC) interface or an Infrared Data Association (IrDA) interface.

The audio module 880 may convert sound into an electrical signal or vice versa. The audio module 880 may process sound information input or output through a speaker 882, a receiver 884, an earphone 886 or the microphone 888.

The camera module 891 is a device that may capture a still image and a moving picture, and according to an embodiment, it may include one or more image sensors, e.g., a front sensor, a rear sensor, a lens (not shown), an Image Signal Processor (ISP) (not shown) or a flash (not shown), e.g., a Light Emitting Diode (LED) or a xenon lamp.

The power management module 895 may manage the power of the electronic device 800. Although not shown, the power management module 895 may include a Power Management Integrated Circuit (PMIC), a charger IC, or a battery or fuel gauge.

The PMIC may be included in an IC or an SoC semiconductor, for example. Charging techniques may be divided into wired and wireless techniques. The charger IC may charge the battery and prevent overvoltage or overcurrent from a charger. According to an embodiment, the charger IC may include at least one of a wired charging technique and a wireless charging technique. The wireless charging technique includes a magnetic resonance type, a magnetic induction type, or an electromagnetic wave type, for example, and an additional circuit for wireless charging may be added such as a coil loop, a resonance circuit, or a rectifier.

The battery gauge may measure the state, current or temperature of the battery 896, or the voltage of the battery 896 during charging, for example. The battery 896 may store or generate electricity and use stored or generated electricity to supply power to the electronic device 800. The battery 896 may include a rechargeable battery or a solar battery, for example.

The indicator 897 may show the specific states of the electronic device 800 or a portion, e.g., the Application Processor 810, of the electronic device 800, such as a booting state, a message state or a charged state. The motor 898 may convert an electrical signal into mechanical vibration. Although not shown, the electronic device 800 may include a processing device, e.g., a GPU, for a mobile TV support. The processing device for the mobile TV support may process media data according to a standard such as Digital Multimedia Broadcasting (DMB), Digital Video Broadcasting (DVB) or media flow.

Each of the above-described elements of the electronic device according to various embodiments of the present disclosure may include one or more components and the names of corresponding elements may vary depending on the category of an electronic device. The electronic device according to various embodiments of the present disclosure may include at least one of the above-described elements and some elements may be left out or other elements may be further included. Also, some of the elements of the electronic device according to various embodiments of the present disclosure are combined to form an entity, which may equally perform the functions of corresponding elements before being combined.

The control method of the electronic device according to various embodiments of the present disclosure as described above may be implemented in programs that may be executed on a terminal device. These programs may be stored and used in various types of recording mediums.

In particular, program codes for performing the above-described methods may be stored in various types of non-volatile recording mediums such as a flash memory, a ROM, an EPROM, an EEPROM, a hard disk, a removable disk, a memory card, an USB memory, and a Compact Disk-ROM (CD-ROM).

According to various embodiments of the present disclosure, it is possible to decrease the elapsed time in the ANQP query/response process when attempting to connect to the passpoint support AP by the electronic device, and thus it is possible to reduce battery consumption. For example, it is possible to decrease the elapsed time in the ANQP query/response process in a congested environment where there are many APs near the electronic device.

According to various embodiments of the present disclosure, it is possible to increase the connectivity when the electronic device attempts to connect to the passpoint support AP.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a communication device configured to communicate with an access point (AP); and
a processor configured to:
find at least one AP through the communication device, and
transmit a query signal to the found at least one AP through the communication device to request a connection,
wherein the processor configures at least one of a maximum number of retransmission times of the query signal and a response standby time of the query signal based on at least one of a number of the found at least one AP and a quality of the found at least one AP.

2. The electronic device according to claim 1, wherein the processor is further configured to search for at least one passpoint support AP through the communication device.

3. The electronic device according to claim 1, wherein the processor is further configured to transmit an access network query protocol (ANQP) query signal to the found at least one AP and to retransmit the ANQP query signal when an ANQP response signal is not received within the response standby time after the transmitting of the ANQP query signal.

4. The electronic device according to claim 1, wherein the processor is further configured to increase the maximum number of re-transmission times of the query signal to a value larger than a specific value when the number of the found at least one AP is smaller than or equal to a preset value.

5. The electronic device according to claim 1, wherein the processor is further configured to increase the response standby time to a value larger than a specific value when the number of the found at least one AP is smaller than or equal to a preset value.

6. The electronic device according to claim 1, wherein the processor is further configured to increase the maximum number of re-transmission times of the query signal to a value larger than a specific value when the quality of the found at least one AP is equal to or greater than a preset reference level.

7. The electronic device according to claim 1, wherein the processor is further configured to decrease the maximum number of re-transmission times of the query signal to a value smaller than a specific value when the quality of the found at least one AP is less than or equal to a preset reference level.

8. The electronic device according to claim 1, wherein the processor is further configured to decrease the response standby time to a value smaller than a specific value when the quality of the found at least one AP is equal to or greater than a preset reference level.

9. The electronic device according to claim 1, wherein the processor uses at least one of a received signal strength indicator (RSSI), a signal to noise ratio (SNR), and signal to interference plus noise ratio (SINR) of at least one of a beacon signal and a probe response signal to determine the quality of an AP.

10. An electronic device comprising:
a communication device configured to communicate with an access point (AP); and
a processor configured to:
find at least one passpoint support AP through the communication device,
select one of the found at least one passpoint support AP, and
transmit an access network query protocol (ANQP) query signal to the selected passpoint support AP through the communication device to request a connection,
wherein the processor is further configured to select at least one passpoint support AP having a quality equal to or greater than a preset reference level as the selected passpoint support AP.

11. The electronic device according to claim 10, wherein the processor is further configured to:
retransmit the ANQP query signal when an ANQP response signal is not received within a response standby time after the transmitting of the ANQP query signal.

12. The electronic device according to claim 10, wherein the processor is further configured not to select an AP included in a pre-stored list of excluded targets as the selected passpoint support AP.

13. The electronic device according to claim 10, wherein the processor is further configured to select at least one AP included in a pre-stored list of allowed targets as the selected passpoint support AP.

14. A method comprising:
- finding at least one access point (AP);
- configuring at least one of a maximum number of retransmission times of a query signal and a response standby time of a query signal based on at least one of a number of the found at least one AP and a quality of the found at least one AP;
- transmitting the query signal to the found at least one AP;
- retransmitting the query signal if a response signal is not received within the response standby time after the transmitting of the query signal;
- receiving the response signal from the found at least one AP to which the query signal is transmitted; and
- connecting to one of the found at least one AP from which the response signal is received.

15. The method according to claim 14, wherein the query signal and the response signal conform to an access network query protocol (ANQP) protocol.

16. The method according to claim 15, wherein the configuring of the at least one of the maximum number of retransmission times of the query signal and the response standby time of the query signal includes increasing the maximum number of retransmission times of the query signal to a value larger than a specific value when the quality of the found at least one AP is equal to or greater than a preset reference level.

17. The method according to claim 14, wherein the configuring of the at least one of the maximum number of retransmission times of the query signal and the response standby time of the query signal includes decreasing the maximum number of retransmission times of the query signal to a value smaller than a specific value when the quality of the found at least one AP is less than or equal to a preset reference level.

18. The method according to claim 14, wherein the configuring of the at least one of the maximum number of retransmission times of the query signal and the response standby time of the query signal includes decreasing the response standby time to a value smaller than a specific value when the quality of the found at least one AP is equal to or greater than a preset reference level.

19. The method according to claim 14, further comprising:
- selecting part of the found at least one AP,
- wherein the transmitting of the query signal includes transmitting the query signal to the selected part of the found at least one AP.

20. The method according to claim 19, wherein the selecting of the part of the found at least one AP includes determining the quality of the found at least one AP and selecting part of the found at least one AP satisfying a preset quality.

\* \* \* \* \*